US009035913B2

United States Patent
Gu et al.

(10) Patent No.: US 9,035,913 B2
(45) Date of Patent: May 19, 2015

(54) POWER SAVING SENSING MODULE FOR COMPUTER PERIPHERAL DEVICES AND METHOD THEREOF

(71) Applicant: PixArt Imaging Inc., Hsinchu County (TW)

(72) Inventors: Ren-Hau Gu, Hsinchu County (TW); Ming-Tsan Kao, Hsinchu County (TW); Sen-Huang Huang, Hsinchu County (TW)

(73) Assignee: PIXART IMAGING INC., Hsinchu County (TW)

( * ) Notice: Subject to any disclaimer, the term of this patent is extended or adjusted under 35 U.S.C. 154(b) by 308 days.

(21) Appl. No.: 13/665,821

(22) Filed: Oct. 31, 2012

(65) Prior Publication Data

US 2013/0300713 A1    Nov. 14, 2013

(30) Foreign Application Priority Data

May 11, 2012    (TW) .............................. 101116949 A

(51) Int. Cl.
*G06F 3/042* (2006.01)
*G06F 1/32* (2006.01)

(52) U.S. Cl.
CPC ........... *G06F 1/3259* (2013.01); *Y02B 60/1253* (2013.01); *Y02B 60/32* (2013.01)

(58) Field of Classification Search
CPC ...................................................... G09G 5/08
USPC ......... 178/18.01, 18.03, 18.09; 345/156, 163, 345/165, 166, 173, 174, 175
See application file for complete search history.

(56) References Cited

U.S. PATENT DOCUMENTS

| | | | |
|---|---|---|---|
| 2003/0006965 A1* | 1/2003 | Bohn ............................. | 345/163 |
| 2008/0100577 A1* | 5/2008 | Sutardja ........................ | 345/166 |
| 2010/0020040 A1* | 1/2010 | Han ............................... | 345/173 |
| 2011/0199338 A1* | 8/2011 | Kim ............................... | 345/175 |
| 2011/0254811 A1* | 10/2011 | Lawrence et al. ............. | 345/175 |
| 2011/0316799 A1* | 12/2011 | Lee et al. ....................... | 345/173 |
| 2014/0232695 A1* | 8/2014 | McGaughan et al. ........ | 345/175 |
| 2014/0240293 A1* | 8/2014 | McCaughan et al. ......... | 345/175 |

* cited by examiner

*Primary Examiner* — Pegeman Karimi
(74) *Attorney, Agent, or Firm* — Tim Tingkang Xia, Esq.; Morris, Manning & Martin, LLP

(57) ABSTRACT

A power-saving sensing module includes a light source, a first and a second sensor, a first and a second detection unit, and a controller. The first sensor detects a touch of an external object to generate a first sensing signal corresponding to the touch. The first detection unit generates a touch signal corresponding to the first sensing signal. The second sensor senses a second sensing signal corresponding to the external object in response to the light ray. When the touch signal is greater than a touch threshold value, the second detection unit outputs a displacement signal corresponding to the second sensing signal. The controller outputs a control signal in response to the touch signal of the first detection unit and the touch threshold value, so that the second detection unit operates at a dormant state or a sensing state in response to the control signal.

14 Claims, 2 Drawing Sheets

POWER SAVING SENSING MODULE FOR COMPUTER PERIPHERAL DEVICES AND METHOD THEREOF

CROSS-REFERENCE TO RELATED APPLICATIONS

This non-provisional application claims priority under 35 U.S.C. §119(a) on Patent Application No(s). 101116949 filed in Taiwan, R.O.C. on May 11, 2012, the entire contents of which are hereby incorporated by reference.

BACKGROUND OF THE INVENTION

1. Technical Field

The disclosure relates to a power-saving sensing module, more particularly to a sensing module which can sense the touch signal to determine whether to enter the power-saving mode.

2. Related Art

Computer has become more and more important for people's daily life. Not merely as a word processing or computing tool, computer also provides entertainment of video and game player. Mouse as an interface of computer improves greatly with computer's function enhancement. The conventional sensing technology applied by a mouse utilizes roller, wheel, and light-emitting diode, and now a mouse may further comprise a laser light source emitting coherent light. Functions of a mouse have extended from cursor control to image zooming, finger identification, and so on. As a result, users may control the computer more conveniently.

A mouse has a wheel which is used to control the scroll bar of the computer window. Now, the function of a mouse's wheel is replaced by that of a touch panel. The lateral scrolling and vertical scrolling of web page can be controlled by a touch panel. Therefore, the touch and detection technology for a mouse is increasingly important.

In the conventional touch and detection technology for an optical module of a mouse, the touch action from a finger or other external object is detected by light intensity variation or fingerprint variation. However, the environment light intensity variation may cause error operations. On the other hand, if the fingerprint variation is not very apparent, the mouse cannot be wakened from a dormant state. Therefore, the detection function is not very stable. Furthermore, the touch action may be detected by determining that whether there is a movement signal or an image differential.

Current computer peripheral devices such as mouse are often designed to have a power-saving function. For example, a mouse may enter a power-saving mode if there is no operation on the mouse for a certain time period. In the above mentioned touch and detection technology, it is possibility that a mouse in the power-saving mode cannot return to the previous operation state.

SUMMARY OF THE INVENTION

In one aspect, a power-saving sensing module is disclosed. The power-saving sensing module comprises a light source for providing a light ray, a first sensor for detecting a touch of an external object to generate a first sensing signal corresponding to the touch, a first detection unit for generating a touch signal corresponding to the first sensing signal in response to the first sensing signal, a second sensor for sensing a second sensing signal corresponding to the external object in response to the light ray, a second detection unit for outputting a displacement signal corresponding to the second sensing signal when the touch signal is greater than a touch threshold value, and a controller for outputting a control signal in response to the touch signal of the first detection unit and the touch threshold value so that the second detection unit operates at a dormant state or a sensing state in response to the control signal.

In another aspect, a power-saving sensing method, the method is disclosed. The power-saving sensing method comprises periodically turning on or turning off a light source to make the light source generate a light ray, detecting a touch of an external object to generate a first sensing signal corresponding to the touch, generating a touch signal corresponding to the first sensing signal in response to the first sensing signal, sensing a second sensing signal corresponding to the external object in response to the light ray, outputting a displacement signal corresponding to the second sensing signal when the touch signal is greater than a touch threshold value, and comparing the touch signal with the touch threshold value to output a control signal so as to enable or disable generating the displacement signal.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION OF THE INVENTION

Figure 1:
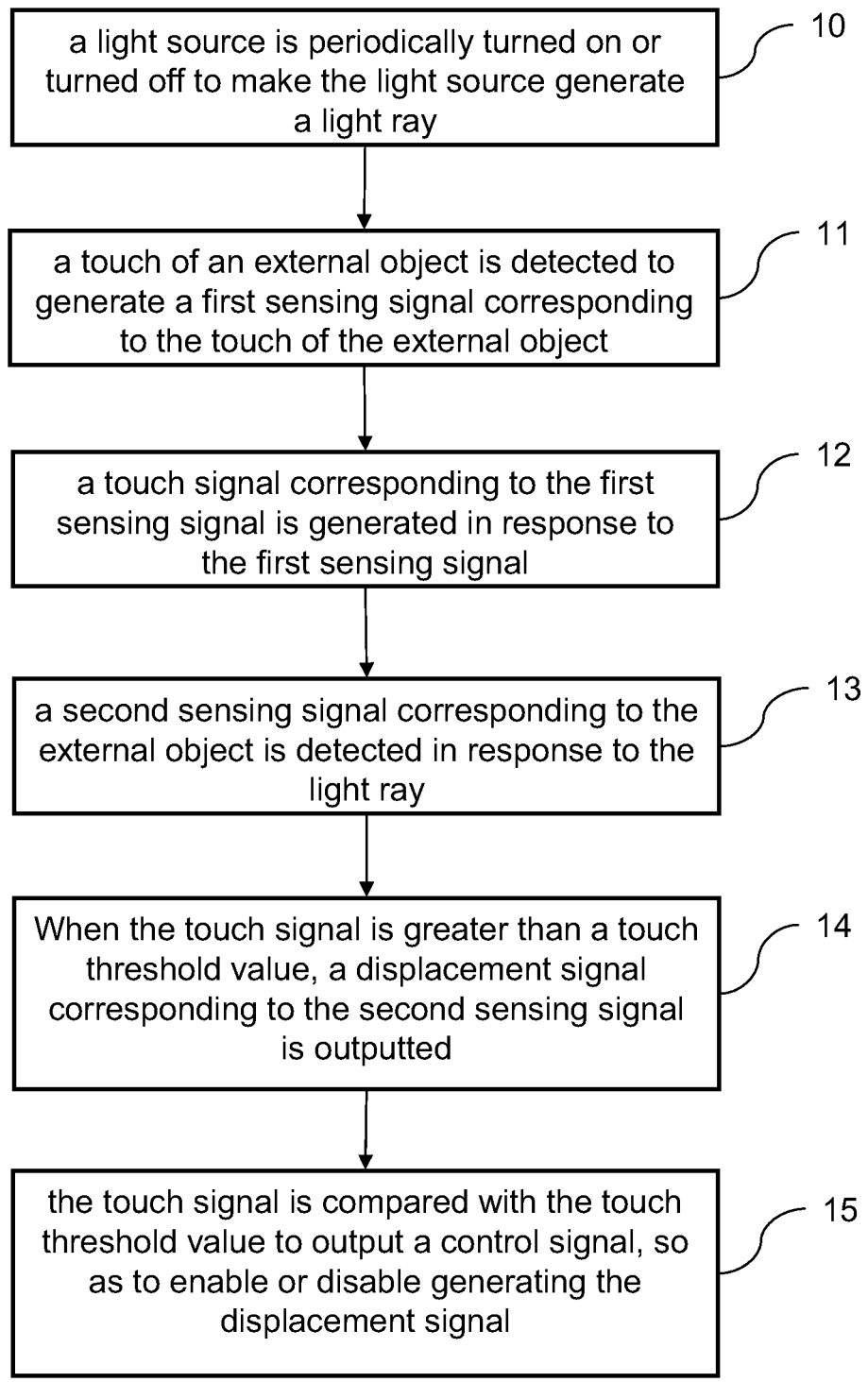
FIG. 1 is a flowchart of a power-saving sensing method according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The detailed characteristics and advantages of the disclosure are described in the following embodiments in details, the techniques of the disclosure can be easily understood and embodied by a person of average skill in the art, and the related objects and advantages of the disclosure can be easily understood by a person of average skill in the art by referring to the contents, the claims and the accompanying drawings disclosed in the specifications.

FIG. 1 is a flowchart of a power-saving sensing method according to an embodiment of the disclosure. The power-saving sensing method can be used for computer peripheral devices such mouse or touch panel.

Firstly, a light source is periodically turned on or turned off to make the light source generate a light ray (step 10). Next, a touch of an external object is detected to generate a first sensing signal corresponding to the touch of the external object (step 11). The external object is generally a user's finger. Also, the external object may be a touch pen. The external object can be anything which can be sensed by the first sensor. When such an external object is getting close to the first sensor, it can be sensed.

Next, a touch signal corresponding to the first sensing signal is generated in response to the first sensing signal (step 12). The first sensing signal can be generated by a capacitance sensor or a resistance sensor. Take capacitance sensor for illustration, when the capacitance value of the capacitance sensor is changed by the external object, a first sensing signal will be generated.

Next, a second sensing signal corresponding to the external object is detected in response to the light ray, and the second sensing signal is generated by an image sensor (step 13). When the touch signal is greater than a touch threshold value, a displacement signal corresponding to the second sensing signal is outputted (step 14). That is, when the external object is getting close to the second sensor, the external object reflects the light ray to make the second sensor detect the reflected light so that the second sensing signal is generated. When the external object moves, the second sensor outputs the displacement signal which is generated based on that the second sensor detects the movement of the reflected light. The reflected light sensed by the second sensor generates light-dark data. Thus, the displacement signal can be obtained from the second sensor's direct conversion of the light-dark data or other processing unit's processing of the light-dark data.

Finally, the touch signal is compared with the touch threshold value to output a control signal, so as to enable or disable generating the displacement signal (step 15). In an embodiment, when the time interval of two successive touch signals is smaller than a first touch threshold value and the displacement signal is smaller than a displacement threshold value, a single-click signal is outputted. In another embodiment, when the time interval of three successive touch signals is smaller than a second touch threshold value and the displacement signal is smaller than a displacement threshold value, a double-click signal is outputted. When the external object is a user's finger for example, if a user wants to make a single-click action, the user's finger presses the contact point. Therefore, the finger will touch the sensor two times quickly, and the positions for the two times of touch are nearly the same. As a result, if the variation of the touch signal and the displacement signal satisfy the above conditions, a single-click action is confirmed. The similar situation is also suitable for a double-clicks or multi-clicks.

In another embodiment, the displacement signal is generated according to a feature value of the second sensing signal.

Figure 2:
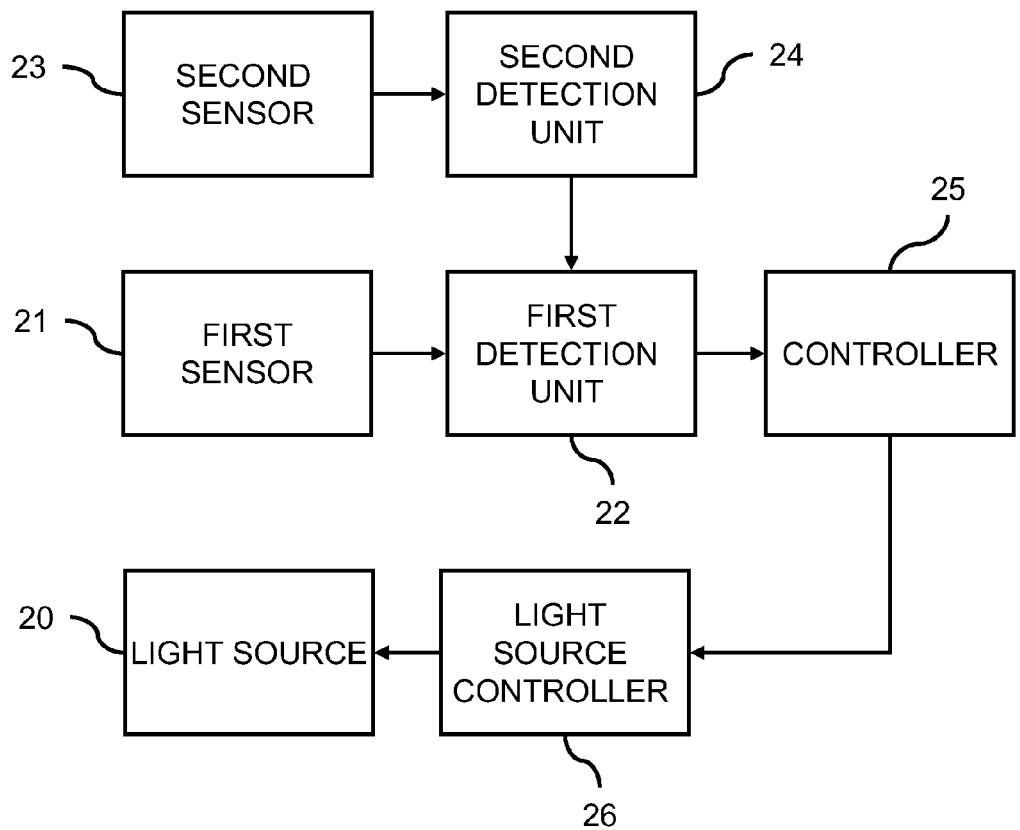
FIG. 2 is a system block diagram of a power-saving sensing module according to an embodiment of the disclosure.

The hardware architecture for the above mentioned sensing method will be described as below. FIG. 2 is a system block diagram of a power-saving sensing module according to an embodiment of the disclosure. The power-saving sensing module comprises a light source 20, a first sensor 21, a second detection unit 24, a second sensor 23, a second detection unit 24, and a controller 25.

The light source 20 is used to provide a light ray for sensing. The light ray forms an image to the second sensor 23 so that the second sensor 23 can detect the image. When the power-saving module is used in a mouse, the light source may be a light-emitting diode or a laser diode. In another embodiment, the power-saving sensing module comprises a light source controller 26 for controlling turning on or turning off the light source 20. The light source 20 is controlled to be turned on at an appropriate time, for example, when a displacement is generated. As a result, electricity power can be saved.

The first sensor 21 is used to detect a touch of an external object to generate a first sensing signal corresponding to the touch. The external object generally is a user's finger. Also, the out object may be a touch pen. That is, the external object can be anything which can be sensed by the first sensor. The first detection unit 22 generates a touch signal corresponding to the first sensing signal in response to the first sensing signal.

In an embodiment, the first sensor 21 is a capacitance sensor. The capacitance sensor uses the electrostatic combination of electrode on the capacitance sensor and the body to generate capacitance variation, and then the induced current is generated to detect the touch of the external object. In another embodiment, the first sensor 21 is a resistance sensor. The electrode on the resistance sensor is conducted by finger press, and the touch of the external object is detected by the pressure variation.

The second sensor 23 senses a second sensing signal corresponding to the external object in response to the light ray of the light source 20. When the touch signal is larger than a touch threshold value, the second detection unit 24 outputs a displacement signal corresponding to the second sensing signal. In an embodiment, the second sensor 23 is an image sensor, for example, Complementary Metal-Oxide-Semiconductor (CMOS) image sensor. The displacement signal is used to generate the displacement of a mouse cursor.

In an embodiment, the movement vector (i.e., the displacement signal) is calculated by finger movement detection algorithm. In an embodiment, the second detection unit 24 generates the displacement signal according to a feature value of the second sensing signal.

The controller 25 outputs a control signal in response to the touch signal generated by the first detection unit 22 and a touch threshold value, so that the second detection unit 24 makes the sensing module operate at a dormant state or a sensing state in response to the control signal. In other words, when the touch signal is larger than a touch threshold value, the movement vector (i.e., the displacement signal) is calculated and outputted. When the touch signal is smaller than a touch threshold value, the sensing module enters the dormant state and the movement vector is not calculated. Moreover, when the sensing module is used in a mouse, the whole computer system may enter a dormant state or a sensing state in response to the control signal generated by the controller 25.

In a computer system, the standby state of the computer system refers to a state with the monitor and hardware turned off. In the standby state, the power of the computer is not cut off and data on memory is not stored on the hardware. Once a user presses any key of the keyboard, the computer returns to the state before the standby mode. The dormant state of a computer system refers to a state with data stored on the hardware. In the dormant state, the power of the computer is cut off. When the computer is restarted, the data is read from the hardware and the computer returns to the state before the dormant state. However, a general mouse does not distinguish the standby state from the dormant state. That is, the dormant state may be the same as the standby state, where the power supply to most modules is cut off but elements for sensing are stilled in power supply. In this case, electricity power can be saved. The dormant state (or standby state) is called as power-saving state. Off course, the sensing state refers to a normal operation state.

When the power-saving sensing module is used in a mouse, a single-click or double-click operation on the mouse is needed to be detected. The detection rule of the disclosure is described as following. When the time interval of two successive touch signals outputted from the first detection unit 22 is smaller than a first touch threshold value, and the displacement signal outputted from the second detection unit 24 is smaller than a displacement threshold value, the second detection unit 24 will output a single-click signal. On the other hand, when the time interval of three successive touch signals outputted from the first detection unit 22 is smaller than a second touch threshold value, and the displacement signal outputted from the second detection unit 24 is smaller than a displacement threshold value, the second detection unit 24 will output a double-click signal.

According to the above described embodiments, the sensing module may be used in an optical mouse, but the disclosure is not limited this way. Other peripheral devices having functions similar to those of a mouse can apply the sensing module of the disclosure. In other words, the sensing module of the present disclosure can be used in peripheral devices for controlling operations of a screen cursor.

According to the power-saving sensing module and the power-saving sensing method according to the present disclosure, the capacitance of a capacitance sensor or the resistance value of a resistance sensor is detected to determine whether there is an external object touching the mouse and thus whether to output a displacement signal or enter the power-saving state. The technical solutions of the present disclosure may overcome the problems in the prior arts where brightness variation or fingerprint is detected to determine whether there is an external object touching the mouse. Furthermore, the technical solutions of the present disclosure can reduce occurrence of error operation and improve the system stability.

Note that the specifications relating to the above embodiments should be construed as exemplary rather than as limitative of the present invention, with many variations and modifications being readily attainable by a person skilled in the art without departing from the spirit or scope thereof as defined by the appended claims and their legal equivalents.

What is claimed is:

1. A power-saving sensing module, comprising:
    a light source for providing a light ray;
    a first sensor for detecting a touch of an external object to generate a first sensing signal corresponding to the touch;
    a first detection unit for generating a touch signal corresponding to the first sensing signal in response to the first sensing signal;
    a second sensor for sensing a second sensing signal corresponding to the external object in response to the light ray;
    a second detection unit for outputting a displacement signal corresponding to the second sensing signal when the touch signal is greater than a touch threshold value; and
    a controller for outputting a control signal in response to the touch signal of the first detection unit and the touch threshold value, so that the second detection unit operates at a dormant state or a sensing state in response to the control signal.

2. The power-saving sensing module according to claim 1, wherein when a time interval of two successive touch signals outputted from the first detection unit is smaller than a first touch threshold value, and the displacement signal outputted from the second detection unit is smaller than a displacement threshold value, the second detection unit outputs a single-click signal.

3. The power-saving sensing module according to claim 1, wherein when a time interval of three successive touch signals outputted from the first detection unit is smaller than a second touch threshold value, and the displacement signal outputted from the second detection unit is smaller than a displacement threshold value, the second detection unit outputs a double-click signal.

4. The power-saving sensing module according to claim 1, wherein the second detection unit generates the displacement signal according to a feature value of the second sensing signal.

5. The power-saving sensing module according to claim 1, wherein the light source is a light-emitting diode or a laser diode.

6. The power-saving sensing module according to claim 1, further comprising a light source controller for controlling turning on or turning off of the light source.

7. The power-saving sensing module according to claim 1, wherein the first sensor is a capacitance sensor or a resistance sensor.

8. The power-saving sensing module according to claim 1, wherein the second sensor is an image sensor.

9. A power-saving sensing method, the method comprising:
    periodically turning on or turning off a light source to make the light source generate a light ray;
    detecting a touch of an external object to generate a first sensing signal corresponding to the touch;
    generating a touch signal corresponding to the first sensing signal in response to the first sensing signal;
    sensing a second sensing signal corresponding to the external object in response to the light ray;
    outputting a displacement signal corresponding to the second sensing signal when the touch signal is greater than a touch threshold value; and
    comparing the touch signal with the touch threshold value to output a control signal so as to enable or disable generating the displacement signal.

10. The power-saving sensing method according to claim 9, further comprising when a time interval of two successive touch signals is smaller than a first touch threshold value, and the displacement signal is smaller than a displacement threshold value, outputting a single-click signal.

11. The power-saving sensing method according to claim 9, further comprising when a time interval of three successive touch signals is smaller than a second touch threshold value, and the displacement signal is smaller than a displacement threshold value, outputting a double-click signal.

12. The power-saving sensing method according to claim 9, wherein the displacement signal is generated according to a feature value of the second sensing signal.

13. The power-saving sensing method according to claim 9, wherein the first sensing signal is generated by a capacitance sensor or a resistance sensor.

14. The power-saving sensing method according to claim 9, wherein the second sensing signal is generated by an image sensor.

\* \* \* \* \*